(12) United States Patent
Ahluwalia et al.

(10) Patent No.: US 12,137,466 B2
(45) Date of Patent: *Nov. 5, 2024

(54) COMMUNICATIONS SYSTEM (71) Applicant: NEC Corporation, Tokyo (JP)

(72) Inventors: Jagdeep Singh Ahluwalia, Sulton (GB); Robert Arnott, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,847

(22) Filed: Dec. 1, 2023

(65) Prior Publication Data

US 2024/0121792 A1 Apr. 11, 2024

Related U.S. Application Data

(60) Continuation of application No. 17/461,521, filed on Aug. 30, 2021, now Pat. No. 11,889,524, which is a
(Continued)

(30) Foreign Application Priority Data

Apr. 27, 2009 (GB) ..................................... 0907180

(51) Int. Cl.
*H04W 72/23* (2023.01)
*H04W 48/12* (2009.01)
(Continued)

(52) U.S. Cl.
CPC ........... *H04W 72/23* (2023.01); *H04W 48/12* (2013.01); *H04W 72/0453* (2013.01);
(Continued)

(58) Field of Classification Search
CPC ..... H04W 72/23; H04W 72/30; H04W 48/12; H04W 72/0453; H04W 88/08
See application file for complete search history.

(56) References Cited

U.S. PATENT DOCUMENTS

| 5,949,777 A | 9/1999 | Uyesugi et al. |
| 2007/0155390 A1 | 7/2007 | Patabandi et al. |

(Continued)

FOREIGN PATENT DOCUMENTS

| CN | 101404526 A | 4/2009 |
| CN | 101404539 A | 4/2009 |

(Continued)

OTHER PUBLICATIONS

Japanese Office Action for JP Application No. 2020-047194 mailed on Jan. 26, 2021, with English Translation.
(Continued)

*Primary Examiner* — Samina F Choudhry
(74) *Attorney, Agent, or Firm* — Sughrue Mion, PLLC (57) ABSTRACT

A mobile communications system is proposed in which mobile communications devices are arranged to transmit signals to and to receive signals from a base station using one or a subset of available sub-bands, with the base station being configured to move the mobile communications devices between the sub-bands. An anchor sub-band is also provided on which idle mobile communications devices camp until they are moved to one or more other sub-bands in addition to or instead of the anchor sub-band.

5 Claims, 6 Drawing Sheets

Related U.S. Application Data continuation of application No. 16/735,012, filed on Jan. 6, 2020, now Pat. No. 11,147,054, which is a continuation of application No. 15/858,889, filed on Dec. 29, 2017, now Pat. No. 10,542,532, which is a continuation of application No. 14/875,797, filed on Oct. 6, 2015, now Pat. No. 9,888,464, which is a division of application No. 13/138,755, filed as application No. PCT/JP2010/057781 on Apr. 26, 2010, now abandoned.

(51) Int. Cl.
*H04W 72/0453* (2023.01)
*H04W 72/30* (2023.01)
*H04W 36/06* (2009.01)
*H04W 68/00* (2009.01)
*H04W 88/02* (2009.01)
*H04W 88/08* (2009.01)

(52) U.S. Cl.
CPC ............ *H04W 72/30* (2023.01); *H04W 36/06* (2013.01); *H04W 68/00* (2013.01); *H04W 88/02* (2013.01); *H04W 88/08* (2013.01)

(56) References Cited

U.S. PATENT DOCUMENTS

| | | | |
|---|---|---|---|
| 2008/0056422 | A1 | 3/2008 | Rao et al. |
| 2008/0117891 | A1 | 5/2008 | Damnjanovic et al. |
| 2008/0186892 | A1 | 8/2008 | Damnjanovic |
| 2009/0103558 | A1 | 4/2009 | Zangi et al. |
| 2009/0253470 | A1 | 10/2009 | Xu |
| 2009/0257387 | A1 | 10/2009 | Gholmieh et al. |
| 2010/0034163 | A1 | 2/2010 | Damnjanovic et al. |
| 2010/0110988 | A1 | 5/2010 | Marinier et al. |
| 2010/0118720 | A1 | 5/2010 | Gauvreau ............ H04W 72/048 370/252 |
| 2010/0130218 | A1 | 5/2010 | Zhang et al. |
| 2010/0227569 | A1 | 9/2010 | Bala et al. |
| 2010/0234037 | A1 | 9/2010 | Terry et al. |
| 2010/0303011 | A1 | 12/2010 | Pan et al. |
| 2010/0316026 | A1 | 12/2010 | Lee ....................... H04L 5/0078 370/336 |
| 2011/0128925 | A1 | 6/2011 | Lindoff et al. |
| 2011/0317627 | A1 | 12/2011 | Kato et al. |

FOREIGN PATENT DOCUMENTS

| | | | | |
|---|---|---|---|---|
| CN | 101297565 | A | 10/2009 | |
| CN | 101828340 | A | 9/2010 | ............. H04L 5/001 |
| EP | 2 480 037 | A1 | 7/2012 | |
| JP | 2010-226721 | A | 10/2010 | |
| JP | 2011-525782 | | 9/2011 | |
| JP | 2012-506674 | | 3/2012 | |
| JP | 2012-522456 | | 9/2012 | |
| WO | WO 2007/073118 | A1 | 6/2007 | |
| WO | WO 2007/148710 | A1 | 12/2007 | |
| WO | WO 2008/069950 | A2 | 6/2008 | |
| WO | WO 2008/111683 | A1 | 9/2008 | |
| WO | WO 2009/019062 | A3 | 2/2009 | |
| WO | WO 2009/020926 | A1 | 2/2009 | |
| WO | WO 2010/008837 | A2 | 1/2010 | |
| WO | WO 2010/048178 | A1 | 4/2010 | |
| WO | WO 2010/051209 | A1 | 5/2010 | |
| WO | WO 2010/100966 | A1 | 9/2010 | |
| WO | WO 2010/114447 | A1 | 10/2010 | |

OTHER PUBLICATIONS

NEC, "Higher Layer Functions to Support Carrier Aggregation", 3GPP TSG-RAN WG2#66, R2-093287, May 8, 2009, pp. 1/3-3/3, USA.

Extended European Search Report for EP Application No. EP20205044.9 dated on Mar. 19, 2021.
Catt, "DL Control Channel Scheme for LTE-A", 3GPP Draft, R•I-091524, 3GPP TSG RAN WG1 meeting #56bis, Mar. 18, 2009, Korea.
Qualcomm Eueope, "Multicarrier Control for LTE-Advanced", 3GPP Draft, Ri-091460, 3GPP TSG RAN WG1 #56bis, Mar. 18, 2009, pp. 1/7-7/7, Korea.
Japanese Office Action dated Sep. 3, 2014.
Qualcomm Europe, "Notion of Anchor Carrier in LTE-A", 3GPP TSG RAN WG1 #56bis, R1-091458, Mar. 2009, pp. 1-5, URL, http://www.3gpp.org/ttp/tsq:•ran/wg1 r11/TSGR1_56b/Docs/R1 -091458.zlp.
Qualcomm Europe, "Carrier Aggregation in Heterogeneous Networks", 3GPP TSG RAN WG1 #56bis, R1 091459, Mar. 2009, pp. 1-12, URL, http://www.3gpp.org/ftp/tsg_ran/wg1_r11/TSGR1_56p/ Docs/R1-091459.zip.
Huawei, "PUCCH design for carrier aggregation", 3GPP TSG RAN WG1 Meeting #56, R1-090813, Feb. 2009, URL, http://www.3gpp. orgi/ftp/tsg_ran/wg1_r11/TSGR1_56/Docs/R1-090813.zip.
CMCC: "R2-092411: Discussions on Carrier Aggregation in RAN2" 3GPP TSG-RAN WG2 Meeting 65BIS Mar. 17, 2009, XP002595400 Internet Publication, pp. 1-4.
Huawei: "R2-092180: RAN2 considerations for carrier aggregation", 3GPP TSG-RAN WG2 Meegin 65BIS, Mar. 17, 2009, XP002595401, Internet Publication, pp. 1-3.
3" Generation Partnership Project: Technical Specification Group Radio Access Network; Evolved Universal Terrestrial Radio Access (E-ULTRA) Medium Access Control (MAC) Protocol Specification (Release 8); 3GPP, Mar. 1, 2009, XP-002555765, vol. 8.50, pp. 1-46.
Chinese Office Action (without English translation) and Chinese Search Report (with English translation) dated Nov. 11, 2014.
NEC Group, "On component carrier types and support for LTE-A features", 3GPP TS-RAN WG1 Meeting #56, R1-090646, Feb. 2009.
Office Action mailed Jan. 14, 2015, by the Japanese Patent Office in counterpart Japanese Patent Application No. 2011-538562.
LG Electronics, "Component carrier types and the corresponding characteristics", 3GPP TS RAN WG1 #56bis, R1-091200, URL, http//www.3gpp.org/ftp/tsg_ran/wg1_r11/TSGR1_56b/Docs/R1- 091200.zip , pp. 1-3, Mar. 2009.
Ericsson, "Carrier aggregation in LTE-Advanced", TSG-RAN WG1 #53bis, R1-082468, URL, http://www.3gpp.org/ftp/tsg_ran/wg1_ r11/TSGR1_53b/Docs/R1-082466.zip , Jul. 2008.
Office Action mailed Apr. 1, 2015, by the Japanese Patent Office in counterpart Japanese Patent Application No. 2014-000748.
Huawei, "Component carrier structures", 3GPP TSG RAN WG1 #56, R1-090814, Feb. 2009.
Office Action mailed May 7, 2015, by the Japanese Patent Office in counterpart Japanese Patent Application No. 2011-538562.
3 Generation Partnership Project: "3 Generation Partnership Project;" Technical Specification Group Radio Access Network; Further Advancements for E-ULTRA Physical Layer Aspects (Release 8) 3GPP Feb. 2009, vol. V1.0.0, pp. 1-31. (35PP TR 36.814 V1 .0.0).
International Search Report dated Aug. 19, 2010, in PCT/JP2010/ 057781.
Huawei, "PDCCH on Carrier Aggregation", [online], 3GPP TSG-RAN WG1#54b R1-083705, Internet URL:http://www.3gpp.org/ ftp/tsg_ran:/WG1_RL.1/TSGR1_54b/Docs/R1-083705.zip, Sep. 2008.
Huawei, "Consideration on carrier aggregation for home eNB", [online], 3GPP TSG-RAN WG1#56 R1-090817, Internet URL :http://www.3gpp.org/ftp/tsg_ran/WG1_RL1/TSGR1_56/Docs/R1- 090817.zip , Feb. 2009.
Nokia Corporation et al., "Stage 3 Description of DRX", [online], 3GPP TSG-RAN WG2#60bis R2-080552, Internet URL:http://www. 3gpp.org/ftp/tsg-ran/WG2_RL2/TSGR2_60bis/Docs/R2-080552. zip , Jan. 2008.
Japanese Office Action mailed Apr. 20, 2016, by the Japanese Patent Office in counterpart Japanese Patent Application No. 2015-132400.
Japanese Office Action mailed Oct. 26, 2016, by the Japanese Patent Office in counterpart Japanese Patent Application No. 2015-132400.

(56) References Cited

OTHER PUBLICATIONS

Chinese Office Action with Search Report dated Jul. 31, 2017, issued in corresponding Chinese Application No. 201510007390 X.
Extended European Search Report issued by the European Patent Office in counterpart European Patent Application Sep. 11, 2017, Application No. 10726327.9.
Qualcomm Europe: "Multicarrier Control for LTE-Advanced" 3GPP Draft; R1-090359, 3"⁰ Generation Partnership Project (3GPP), Mobile Competence Centre; 650 Route Des Lucioles; F-06921 XP050318265 Jan. 8, 2009.
Qualcomm Europe: "Notion of Anchor Carrier in LTE-A", 3GPP Draft; R1-090860, 3rd Generation Partnership PROJECT(3GPP) Mobile Competence Centre; 650, Route Des Lucioles; F-06921 XP050318710, Feb. 3, 2009.
Panasonic, "MAC to physical layer mapping and control signaling for carrier aggregation", 3GPP TSG-RAN WG1 Meeting #55, R1-084222, Nov. 10-14, 2008, pp. 1-4.
Jaehee CHO, et al., Proposed Text of Multi-carrier Operation for the IEEE 802 16, Amendment IEEE 802.16 Broadband Wireless Access Working Group, Apr. 27, 2009, pp. 1-11.
Decision to Grant a Patent dated May 30, 2018, issued in counterpart Japanese Patent Application No. 2017-077988.
ZTE: "Downlink control structure for LTE-A", 3GPP Draft; R1-090628 Downlink Control Structure for LTE-A, 3rd Generation Partnership Project (3GPP), Mobile Competence Centre ; 650, Route Des Lucioles ; F-06921 Sophia-Antipolis Cedex; France, No. Athens, Greece; 20090203, Feb. 3, 2009 (Feb. 3, 2009), XP050318509, [retrieved on Feb. 3, 2009].
English-language Office Action dated Jun. 27, 2018, issued by the European Patent Office in a corresponding application No. 10 726 327.9.
Decision to Grant a Patent dated Mar. 13, 2019, issued by the Japanese Patent Office in counterpart Japanese Patent Application No. 2018-124032.
Japanese Office Communication for JP Application No. 2021-119758 mailed on Aug. 23, 2022 with English Translation.
NEC Group, MAC-to-physical-layer mapping issues for LTE-A, 3GPP TSG-RAN WG1#55bis, R1-090512, Jan. 16, 2009.
LG Electronics, "UE-specific Carrier Assignment for LTE-Advanced", 3GPP TSG RAN WG1 Meeting #56bis, R1-091207, Mar. 23-27, 2009, Seoul, Korea.
JP Office Communication for JP Application No. 2023-097383, mailed on Apr. 23, 2024 with English Translation.
Panasonic, "Details on MAC Control Element for Component Carrier Management", 3GPP TSG-RAN WG2 #70 R2-102757. May 3, 2010, pp. 1-pp. 5.

COMMUNICATIONS SYSTEM

CROSS-REFERENCE TO RELATED PATENT APPLICATIONS

This application is a continuation of U.S. patent application Ser. No. 17/461,521, filed Aug. 30, 2021, which is a continuation of U.S. patent application Ser. No. 16/735,012, filed Jan. 6, 2020, now U.S. Pat. No. 11,147,054, which is a continuation of U.S. patent application Ser. No. 15/858,889, filed Dec. 29, 2017, now U.S. Pat. No. 10,542,532, which is a continuation of U.S. patent application Ser. No. 14/875,797, filed Oct. 6, 2015, now U.S. Pat. No. 9,888,464, which is a divisional of U.S. patent application Ser. No. 13/138,755, filed Sep. 23, 2011, which is a National Stage Entry of International Application No. PCT/JP2010/057781, filed Apr. 26, 2010, which claims priority from United Kingdom Patent Application No. 0907180.4, filed Apr. 27, 2009. The entire contents of the above-referenced applications are expressly incorporated herein by reference.

TECHNICAL FIELD

The present invention relates to communications devices, particularly but not exclusively devices operating according to the 3GPP standards or equivalents or derivatives thereof. The invention has particular but not exclusive relevance to the impacts of carrier aggregation that is to be used in LTE-Advanced as currently defined in 3GPP standards documentation TR 36.814.

BACKGROUND ART

With LTE Rel 8, a transmission band of 20 MHz was defined. In LTE-Advanced carrier aggregation will be used to support system bandwidths up to 100 MHz. This involves splitting the system bandwidth into five 20 MHz sub-bands, each centred on a respective component carrier. In order to be backwards compatible with LTE Rel 8 User Equipment (UEs), at least one of those sub-bands has to be LTE Rel 8 compliant.

To support carrier aggregation a new Physical Downlink Control Channel (PDCCH). structure is needed to address the aggregated system bandwidth of up to 100 MHz. Two different approaches, separate PDCCH for each carrier and common PDCCH for multiple carriers, are under consideration in RAN 1. One of these two methods will be agreed to be adopted for the LTE-Advanced System. Irrespective of this decision, at any given point in time the UE may not transmit or receive data on all the component carriers. The base station (referred to as the eNB in LTE documentation) should have the flexibility to schedule a UE on any of the component carriers it wishes and should be able to move the UE on to different component carriers as required. The UE on the other hand should know in advance which subset of the component carriers it should monitor and turn off its RF transceiver circuitry for the others. This would result in considerable power savings in the UE.

DISCLOSURE OF INVENTION

The present invention provides a simple mechanism by which the eNB scheduler can switch the UE among the different component carriers.

According to one exemplary aspect, the present invention provides a communications device comprising: a transceiver operable to transmit downlink data to and to receive uplink data from a remote communications device using a plurality of component carriers; and a controller operable to control the transceiver so that the communications device transmits broadcast and paging channels on an anchor subset of said component carriers but not on another subset of the component carriers.

The controller may transmit control data to the remote communications device instructing the remote device to monitor one or more component carriers in the other subset of component carriers. This may be in addition to or instead of monitoring component carriers in the anchor subset. The controller may also transmit DRX control data to the remote communications device to cause the remote device to switch off transceiver circuits for component carriers that it has not been instructed to monitor. The controller may transmit the control data within a MAC layer communication message as this is fast and relatively reliable compared with RRC layer signalling.

The controller may receive a connection request from the remote communications device on a component carrier belonging to the anchor subset and in response transmits downlink data for the remote communications device on a different component carrier. Before sending the downlink data, the controller would inform the remote communications device of the component carriers it will use to carry the downlink data.

The present invention also provides a communications device comprising: a transceiver operable to transmit uplink data to and to receive downlink data from a remote communications device on a plurality of component carriers, wherein an anchor subset of the component carriers include broadcast and paging channels; and a controller operable to control the transceiver so that during an idle mode, the communications device is operable to camp on one or more of the component carriers in the anchor subset. The communications device can thus receive system and paging information when in Idle mode.

The controller may receive control data from the remote communications device instructing the communications device to monitor one or more component carriers in another subset of the component carriers and the controller may control the transceiver to monitor the component carriers in that other subset. The controller may also receive DRX control data from the remote communications device and which the controller can use to determine when to switch off parts of the transceiver configured for component carriers that are not to be monitored.

The control data is preferably received within a MAC layer communication message. When the communications device wishes to make a connection, for example, to make a call, the controller may transmit a connection request on the component carrier on which the device is camped and may receive downlink data from the remote communications device on a different component carrier that the communications device has been instructed to monitor.

In order to save battery power, the controller can switch off parts of the transceiver for component carriers on which the communications device is not camped or is not monitoring.

The present invention also provides a communications device comprising: a transceiver operable to transmit downlink data to and to receive uplink data from a remote communications device using a subset of component carriers; and a controller operable to control the transceiver so that: i) during a first interval the communications device is operable to communicate with the remote communications device on a first subset of component carriers; ii) the communications device transmits control data to the remote communications device using the first subset of component carriers, the control data instructing the remote communications device to communicate with the communications device using a second subset of component carriers; and iii) during a second interval the communications device is operable to communicate with the remote communications device on the second subset of component carriers.

The invention also provides a communications device comprising: a transceiver operable to transmit uplink data to and to receive downlink data from a remote communications device using a subset of component carriers; and a controller operable to: i) control the transceiver so that during a first interval the communications device is operable to communicate with the remote communications device on a first subset of component carriers; ii) receive control data from the remote communications device using the first subset of component carriers, the control data instructing the communications device to communicate with the remote communications device using a second subset of component carriers; and iii) control the transceiver so that during a second interval the communications device is operable to communicate with the remote communications device on the second subset of component carriers.

The invention provides, for all methods disclosed, corresponding computer programs or computer program products for execution on corresponding equipment, the equipment itself (user equipment, nodes or components thereof) and methods of updating the equipment.

An exemplary embodiment of the invention will now be described, by way of example, with reference to the accompanying drawings in which:

BEST MODE FOR CARRYING OUT THE INVENTION

Overview

Figure 1:
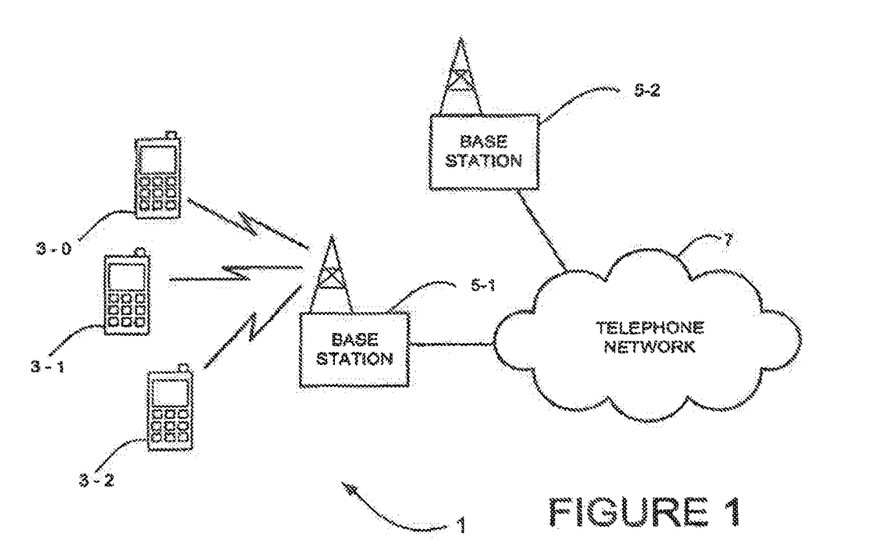
FIG. 1 schematically illustrates a mobile telecommunication system of a type to which the invention is applicable.

FIG. 1 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. A number of uplink and downlink communications resources (sub-carriers, time slots etc) are available for the wireless link between the mobile telephones 3 and the base stations 5. In this exemplary embodiment, the base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5.

In this exemplary embodiment, the system bandwidth is divided into five 20 MHz sub-bands, each being carried by a respective component carrier. The base station 5 is operable to allocated resources for each mobile telephone 3 on one or more of the component carriers, depending on the capability of the mobile telephone 3 concerned and the amount of data to be transmitted between the base station 5 and that mobile telephone 3. The mobile telephones 3 have transceiver circuitry that can receive and transmit signals on the different component carriers and when the mobile telephone 3 is not scheduled to use a particular component carrier, it can power down the corresponding transceiver circuitry to conserve battery power.

LTE Sub-Frame Data Structure

Before discussing the specific ways in which the base station 5 schedules the different mobile telephones 3, a description will be given of the access scheme and a general frame structure agreed for LTE Rel 8. An Orthogonal Frequency Division Multiple Access (OFDMA) technique is used for the downlink to allow the mobile telephones 3 to receive data over the air interface with the base station 5. Different sub-carriers are allocated by the base station 5 (for a predetermined amount of time) to each mobile telephone 3 depending on the amount of data to be sent to the mobile telephone 3. These are referred to as physical resource blocks (PRBs) in the LTE specifications. PRBs thus have a time and frequency dimension. To do this, the base station 5 dynamically allocates PRBs for each device that it is serving and signals the allocations for each sub-frame (TTI) to each of the scheduled mobile telephones 3 in a control channel.

Figure 2A:
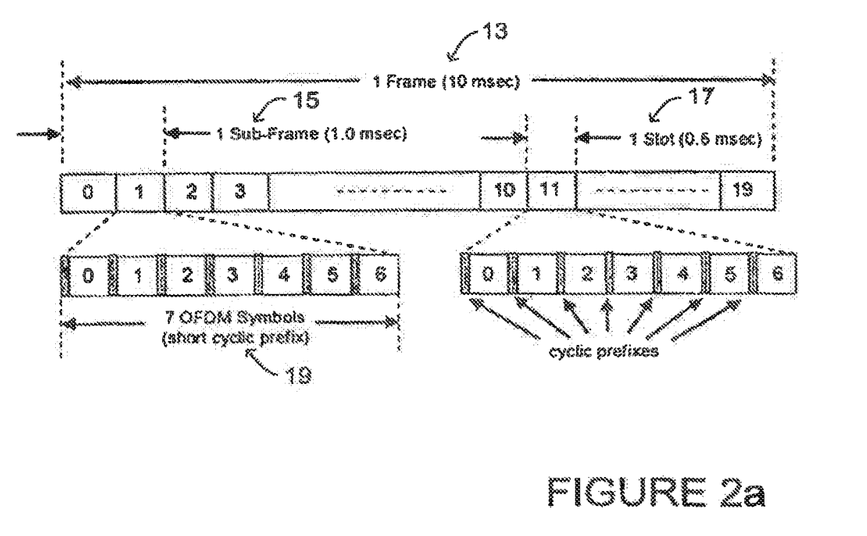
FIG. 2a schematically illustrates a generic frame structure used in communications over the wireless links of the system shown in FIG. 1.
Figure 2B:
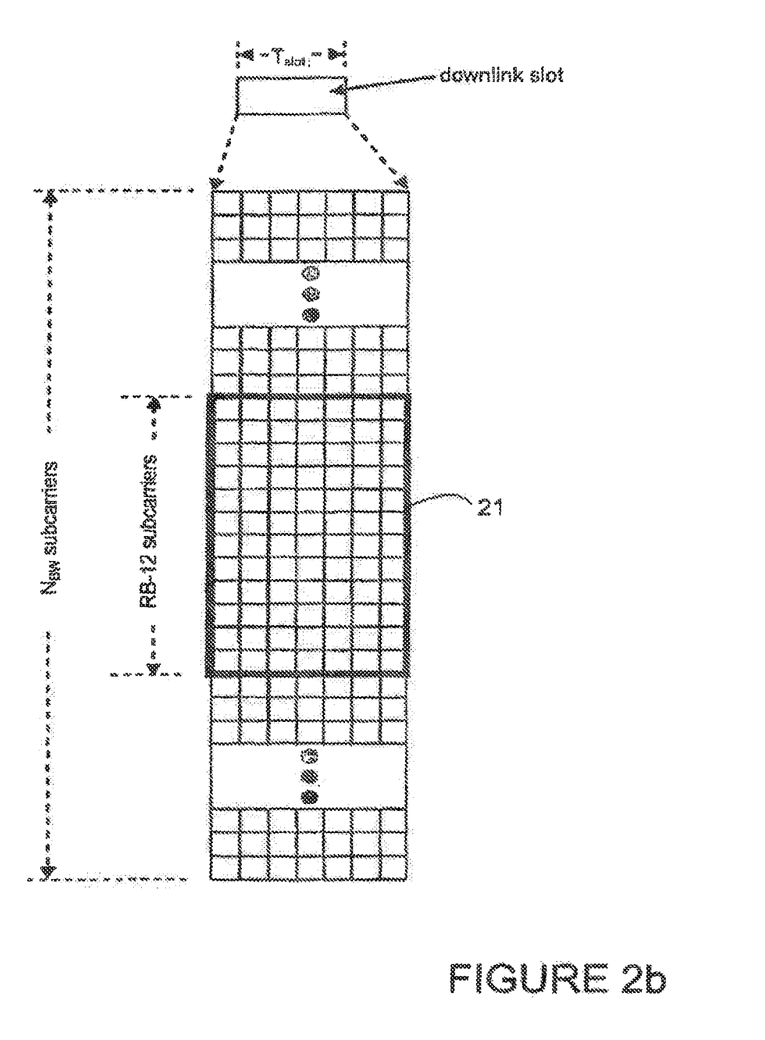
FIG. 2b schematically illustrates the way in which the frequency subcarriers am divided into resource blocks and the way that a time slot is divided into a number of OFDM symbols.

FIG. 2a illustrates a generic frame structure agreed for LTE Rel 8 communications over the air interface with the base station 5. As shown, one frame 13 is 10 msec long and comprises ten sub-frames 15 of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17. A PRB over two slots is also defined by the LTE specifications as being the smallest element of resource allocation assigned by the base station scheduler. These sub-carriers are then modulated onto a component carrier to up-convert the signal to the desired transmission bandwidth. The transmitted downlink signal thus comprises $N_{BW}$ sub-carriers for a duration of $N_{symb}$ OFDM symbols. It can be represented by a resource grid as illustrated in FIG. 2b. Each box in the grid represents a single sub-carrier for one symbol period and is referred to as a resource element. As shown, each PRB 21 is formed from 12 consecutive sub-carriers and (in this case) seven symbols for each subcarrier; although in practice the same allocations are made in the second slot 17 of each sub-frame 15 as well.

At the start of each sub-frame 15, the base station 5 transmits a PDCCH 23 (Physical Downlink Control Channel) over the first three symbols. The remaining symbols form the PDSCH 25 (Physical Downlink Shared CHannel) which is used to carry the downlink user data for the mobile telephones 3. The PDCCH channel includes, among other things, data for each of the mobile telephones 3, indicating if the mobile telephone 3 is scheduled for receiving downlink data in that sub-frame or is scheduled for uplink transmission in that sub-frame; and if so, data identifying the PRBs to be used for receiving the downlink data or for transmitting the uplink data.

LTE-Advanced

Figure 3:
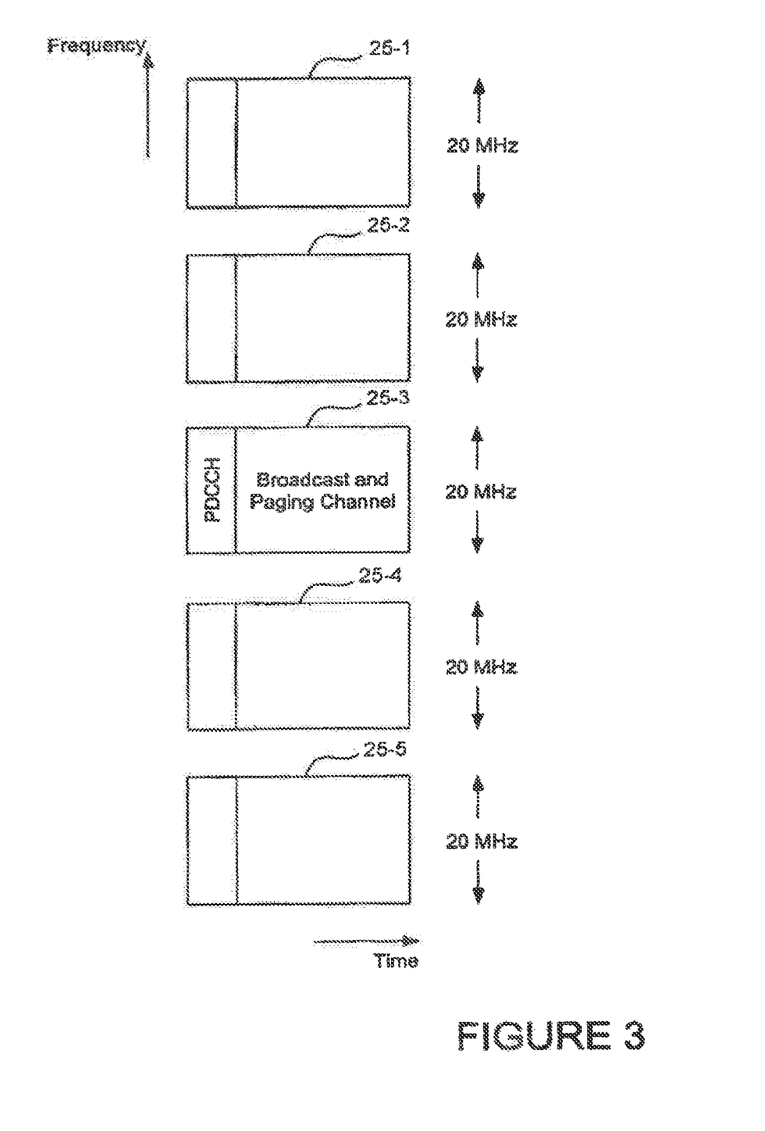
FIG. 3 schematically illustrates the way in which carrier aggregation is used to provide a system bandwidth of up to 100 MHz.

In the proposed LTE-Advanced system, a number of separate sub-bands will be provided in order to support wider transmission bandwidths, each of the sub-bands will at least be similar in structure to the LTE structure discussed above. The sub-carriers for each sub-band will be modulated onto a separate component carrier so that the transmitted sub-bands are contiguous or non-contiguous with each other. This is known as carrier aggregation and is schematically illustrated in FIG. 3 for five sub-bands 25-1 to 25-5, each being 20 MHz wide, giving a total system bandwidth of 100 MHz. In the following description, the terms sub-band and component carrier will be used interchangeably.

Although LTE-Advanced mobile telephones 3 will support bandwidths up to 100 MHz, they may not transmit/receive in the whole spectrum at any given time. In order to allow the mobile telephones 3 to save battery power the system is preferably arranged so that the mobile telephones 3 monitor one or a subset of the component carriers to start with; and then the base station scheduler, based on the activity of the mobile telephone 3, can direct the mobile telephone 3 to monitor a different (although perhaps overlapping) subset of the component carriers.

If all component carriers (sub-bands 25) are configured as LTE Rel 8 compatible, then full system information and paging would be broadcast on each component carrier. However the inventor considers this to be a waste of system resources. The inventor has realised that since all these component carriers belong to one cell (of base station 5) there is no real benefit in putting the paging and broadcast information in each of the component carriers (sub-bands 25). The inventor therefore proposes that only one or a subset of the component carriers in the cell should carry broadcast and paging information. In this exemplary embodiment, one component carrier (sub-band 25) carries this system information and it will be referred to as the anchor or primary carrier component. This is illustrated in FIG. 3, which shows that sub-band 25-3 is the anchor carrier component and it carries the broadcast and paging information for the cell. Thus, all mobile telephones 3 will camp on this anchor carrier component when in the Idle mode and will read the system and paging information from it.

Release 8 mobile telephones 3 will only be scheduled on one of the anchor carrier components as they will have the same structure as defined for LTE Release 8. For an LT-Advanced mobile telephone 3, since it will be camped on the anchor carrier component of the cell when Idle, the inventor proposes that such a mobile telephone 3 would initiate the RRC Connection Establishment Procedure on the anchor carrier component when it wants to make a connection (for example to make a call). Once the RRC Connection or an EPS bearer is established, the base station 5 can then instruct the mobile telephone 3 to move to one or more different component carriers at a suitable Instance. This helps in balancing the load among the different component carriers within the cell and reduces battery consumption in the mobile telephone 3 as the mobile telephone only has to monitor a subset of the carrier components together with the anchor carrier component.

The base station 5 can signal which of the component carriers the mobile telephone 3 should monitor and on which the mobile telephone 3 should transmit/receive data, by:
PDCCH Signalling
MAC Signalling
RRC Signalling.

In all three cases an Information Element (IE) will be needed that will be 5 bits long, with each bit corresponding to one of the component carriers and identifying whether or not the mobile telephone 3 should monitor the corresponding component carrier.

PDCCH Signalling: Signalling a mobile telephone 3 which component carrier it should monitor through PDCCH is the fastest technique. However, it is also the most unreliable (as no acknowledgement is sent by the mobile telephone 3 back to the base station 3 to acknowledge receipt of the information). PDCCH signalling can be achieved by signalling a special PDCCH format with a 5-bit bitmap indication for each mobile telephone 3 in sub-frame (n−1), indicating that the mobile telephone 3 should start listening to the component carriers for which the bit is set to "1" from sub-frame (n) onwards, until a further change is signalled.

MAC Signalling: Signalling each mobile telephone 3 which component carriers it should monitor through a MAC Control element is fast and fairly reliable. It could be achieved, for example, by having an IE in the DRX Command MAC Control Element, with a 5-bit bitmap indication for each mobile telephone 3, indicating that the mobile telephone 3 should start listening to the corresponding component carriers for which the bit is set to "1". The base station 5 can then assume that the mobile telephone 3 has applied the new configuration once it has received the acknowledgement that the mobile telephone 3 has received the DRX Command MAC Control Element.

RRC Signalling: RRC layer Signalling each mobile telephone 3 which component carriers it should monitor through an RRC message would be slow but very reliable. However, as the component carriers that a mobile telephone 3 may monitor might change frequently, RRC signaling is not preferred for this purpose.

Therefore, in this embodiment, MAC Signalling is used for indicating to each mobile telephone 3 which component carriers it should monitor. As they will not monitor or transmit/receive data on the other component carriers, LTE-Advanced mobile telephones 3 can switch off their transceiver circuitry for the component carriers they will not monitor.

DRX Handling

Figure 4:
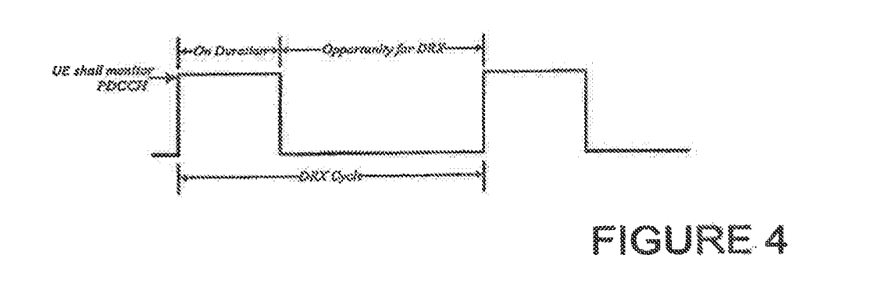
FIG. 4 illustrates a DRX timing pattern generated by the base station for a mobile telephone and used to control when the mobile telephone is asleep and awake.

In LTE Rel 8, each mobile telephone 3 can be configured to receive and/or transmit data in discontinuous time periods, the duration and frequency of which are controlled by the base station 5. This discontinuous reception/transmission is called DRX/DTX and allows the mobile telephone 3 to turn off its transceiver circuitry during the periods when it is not supposed to receive data from and/or transmit data to the base station 5, thereby reducing power consumption. The base station 5 defines the DRX pattern such that the mobile telephone 3 remains awake for the on-duration and monitors PDCCH and then goes to sleep. This concept is illustrated in FIG. 4.

A similar although more complex DRX procedure can be used to control LTE-Advanced mobile telephones 3 so that they switch off their transceiver circuitry for component carriers they are not monitoring even during the defined "On-Duration". Indeed there are two possible ways of configuring DRX for LTE-Advanced mobile telephones.

Alternative 1: The same basic LTE Rel-8 mechanism is used for LTE-Advanced, with certain modifications to keep the system simple and backwards compatible. In particular, a two level DRX configuration can be used. On the first level one DRX configuration (On Duration, DRX Cycle) Is configured by the RRC layer of the base station 5 for the mobile telephone 3 (identical to what is defined for LTE Rel 8). On the second level, during the "On-Duration" the mobile telephone 3 will monitor the component carriers indicated by the MAC control element (DRX Command MAC Control Element). Hence even during the on-duration the UE will monitor only those carriers that are actually needed to be monitored and can switch off its transceiver circuitry for reviving the other carriers. This will provide considerable savings in battery life.

When the mobile telephone's activity increases, the mobile telephone 3 will start transmitting/receiving on an increased number of component carriers but the "On duration" would remain unchanged. If the mobile telephone 3 is already transmitting/receiving on on all the component carriers and if there is a further increase in activity, then the base station 5 can increase the On-duration defined for that mobile telephone 3.

Alternative 2: Another alternative is to have one DRX configuration per component carrier (On Duration DRX Cycle). In this case the mobile telephone 3 would perform a Boolean "OR" of the DRX configurations for all the component carriers to determine the overall DRX pattern—defining when the mobile telephone 3 should be awake and asleep; and would use the individual DRX configurations to control the switching off of the transceiver circuitry for the non-monitored component carriers during the awake periods. However, battery savings in the mobile telephone 3 will be less with this alternative if the DRX cycles and the starting instances of the On Durations for the component carriers are not time aligned. Hence a better way would be to have the same DRX cycle for all component carriers but with different On Durations. This would also work if the DRX cycle for one or more of the component carriers is an integer multiple of the DRX cycle of the other component carriers.

Base Station

Figure 5:
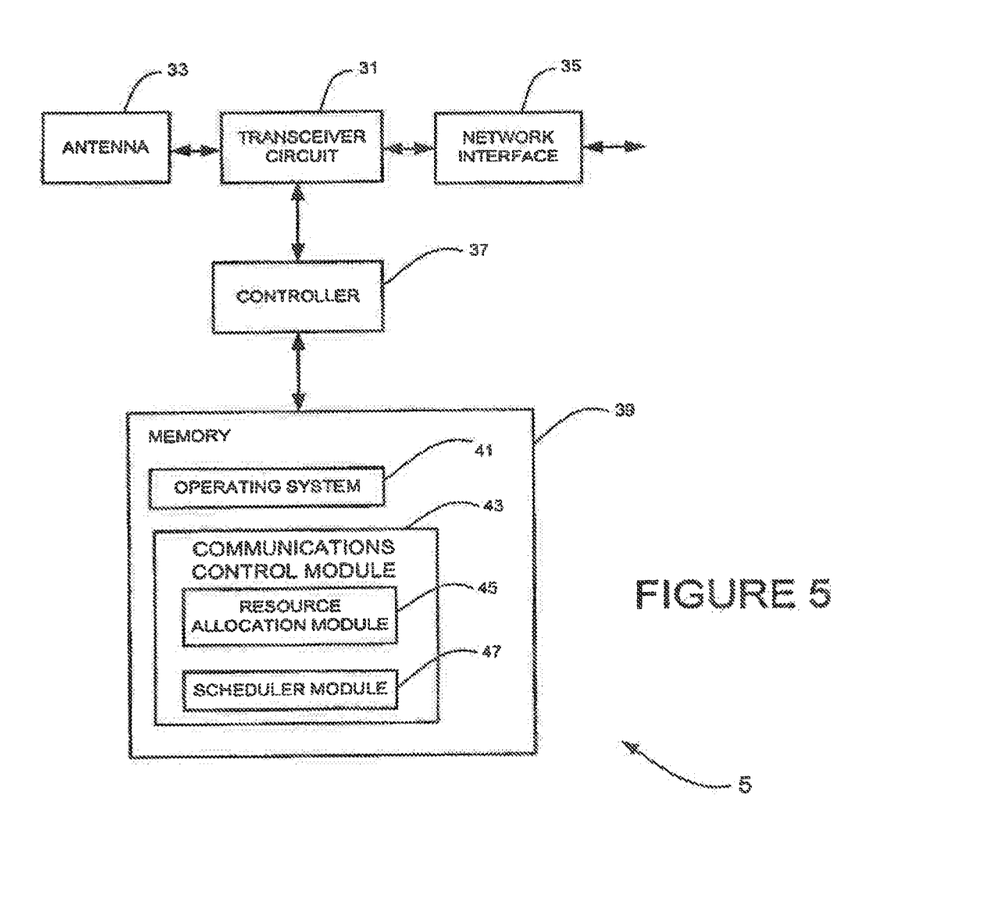
FIG. 5 schematically illustrates a base station forming part of the system shown in FIG. 1.

FIG. 5 is a block diagram illustrating the main components of each of the base stations 5 shown in FIG. 1. As shown, each base station 5 includes transceiver circuit 31 which is operable to transmit signals to and to receive signals from the mobile telephones 3 via one or more antennas 33 and which is operable to transmit signals to and to receive signals from the telephone network 7 via a network interface 35. A controller 37 controls the operation of the transceiver circuit 31 in accordance with software stored in a memory 39. The software includes, among other things, an operating system 41 and a communications control module 43 having a resource allocation module 45 and a scheduler module 47. The communications control module 43 is operable to control the generation of the sub-frames in the different sub-bands 25 in which the uplink and downlink data is transmitted from/to the mobile telephones 3. The resource allocation module 45 is operable for allocating the resource blocks in the different sub-bands 25 to be used by the transceiver circuit 31 in its communications with each of the mobile telephones 3, depending on the amount of data to be transmitted between the base station 5 and the mobile telephones 3. The scheduler module 47 is operable to schedule the times for the transmission of the downlink data to the mobile telephones 3 and the times for the mobile telephone 3 to transmit its uplink data to the base station 5. The communications control module 43 is responsible for signalling, to each of the mobile telephones 3, data identifying which component carriers the mobile telephone should be monitoring when in the Idle mode; and for moving the mobile telephones 3 between the different component carriers when in RRC Connected mode; and for defining the DRX patterns used for controlling the times when the mobile telephones 3 can switch off its transceiver circuitry.

Mobile Telephone

Figure 6:
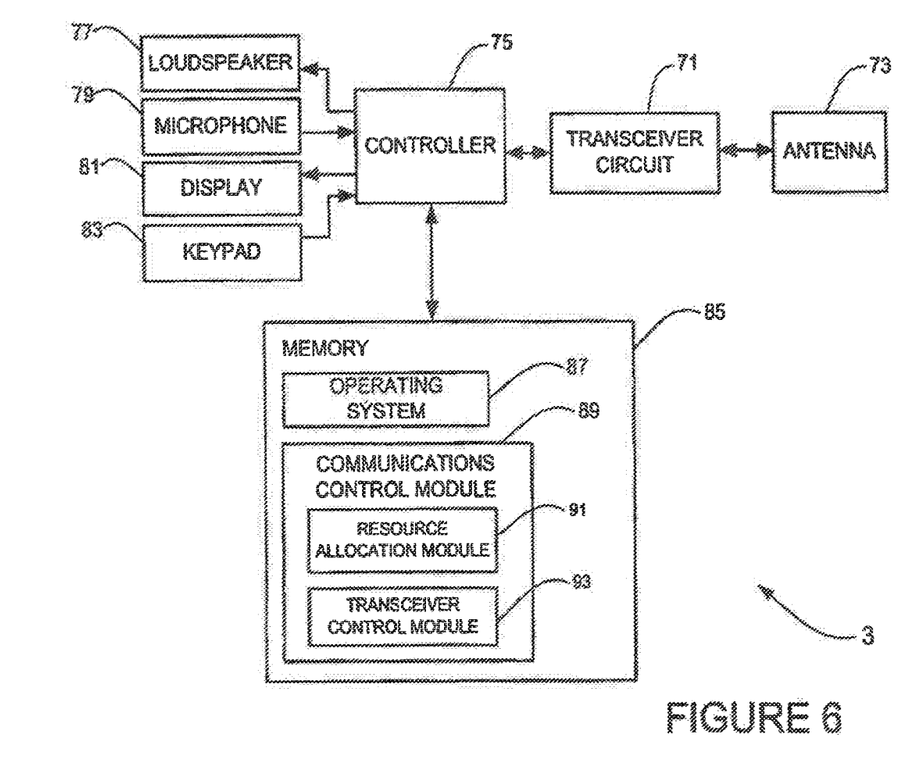
FIG. 6 schematically illustrates a mobile telephone forming part of the system shown in FIG. 1.

FIG. 6 is a block diagram illustrating the main components of each of the mobile telephones 3 shown in FIG. 1. As shown, the mobile telephones 3 include transceiver circuit 71 that is operable to transmit signals to and to receive signals from the base station 5 via one or more antennas 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within a memory 85. As shown, these software instructions include, among other things, an operating system 87 and a communications control module 89 that includes a resource allocation module 91 and a transceiver control module 93. The communications control module 89 is operable to control communications with the base station 5 and during the Idle mode monitors the anchor component carrier 25-3. The resource allocation module is responsible for identifying the resources on which uplink should be transmitted and on which downlink data is to be received in the different sub-bands 25. The transceiver control module 93 is responsible for identifying the parts of the transceiver circuit 71 that can be switched off at the current instance using, for example, DRX configuration data received from the base station 5 or using knowledge of the sub-bands 25 that the mobile telephone 3 is to monitor.

In the above description, the base station 5 and the mobile telephones 3 are described for ease of understanding as having a number of discrete modules (such as the resource allocation modules, scheduler module, transceiver control module etc). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entitles.

Figure 7:
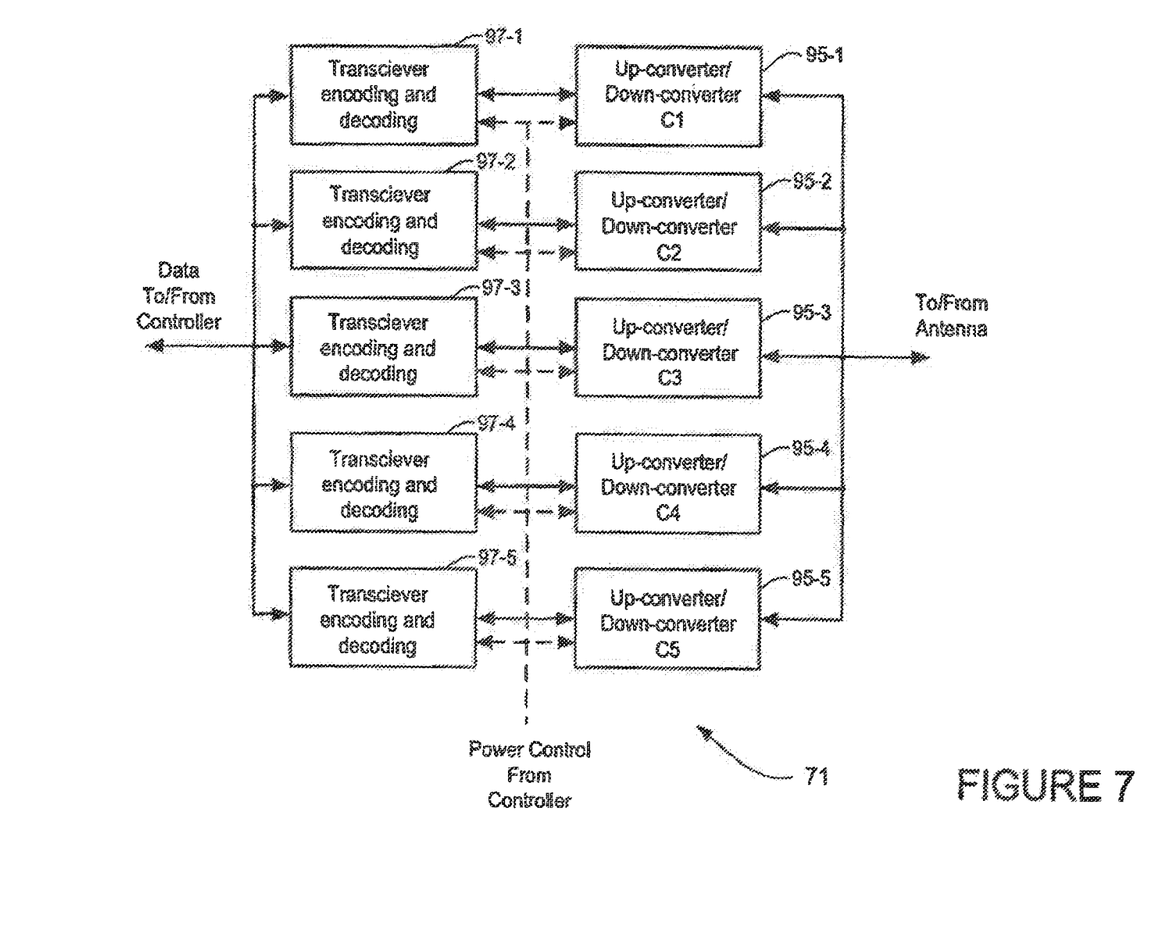
FIG. 7 is a block diagram illustrating the main components of transceiver circuitry forming part of the mobile telephone shown in FIG. 6.

As mentioned above, LTE-Advanced mobile telephones 3 have transceiver circuit 71 that can transmit and receive data on a number of different component carriers. FIG. 7 is a block diagram illustrating suitable transceiver circuit 71 that may be used. As shown, the transceiver circuit 71 includes five up-converter/down-converter circuits 95-1 to 95-5, one for each of the five sub-bands 25, for modulating and demodulating the sub-carriers onto the corresponding component carrier (C1 to C5). The transceiver circuit 71 also includes five encoding/decoding circuits 97-1 to 97-5 for encoding and decoding the uplink data and downlink data respectively in each of the five sub-bands 25. The encoding/decoding circuits 97 receive the uplink data from, and pass the decoded downlink data to, the controller 75. The controller 75 also supplies individual power control signals (via the dashed signal lines) to the encoding/decoding circuits 97 and to the up-converter circuits 95, so that individual circuits can be powered down when not needed and so that they can all be powered down when none of the circuits are needed (for example when the mobile telephone 3 enters its sleep mode).

Modifications and Alternatives

A detailed embodiment has been described above. As those skilled in the art will appreciate, a number of modifications and alternatives can be made to the above embodiment whilst still benefiting from the inventions embodied therein. By way of illustration only a number of these alternatives and modifications will now be described.

In the above embodiment, a mobile telephone based telecommunications system was described. As those skilled in the art will appreciate, the signalling and power control techniques described in the present application can be employed in any communications system. In the general case, the base stations and the mobile telephones can be considered as communications nodes or devices which communicate with each other. Other communications nodes or devices may include user devices such as, for example, personal digital assistants, laptop computers, web browsers, etc.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities. Similarly, although the above embodiments employed transceiver circuitry, at least some of the functionality of the transceiver circuitry can be performed by software.

Various other modifications will be apparent to those skilled in the art and will not be described in further detail here.

The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

INTRODUCTION

To support carrier aggregation a new PDCCH structure is needed to address up to 100 MHz of aggregated system bandwidth. Two different approaches, separate PDCCH for each carrier and common PDCCH for multiple carriers, are under consideration in RAN 1. One of the methods will be agreed to be adopted for LTE Advance System. Irrespective of this decision, at any given point in time the UE may not transmit or receive data on all the component carriers. eNB scheduler should have the flexibility to schedule a UE in any of the component carrier it wishes and should be able to move it around. The UE on the other hand should know in advance which subset of the component carriers it should monitor and turn off the RF for the others. This would result in considerable power savings in UEs.

In this contribution we discuss the simple mechanism by which the eNB scheduler could switch the UE would among different component carriers.

DISCUSSION

In LTE Advance system we would see Carrier aggregation, where two or more component carriers are aggregated in order to support wider transmission bandwidths e.g. up to 100 MHz and for spectrum aggregation. These carrier aggregations could be contiguous or non-contiguous. Although LTE Advanced UEs will support 100 MHz BW however it may not transmit/receive in the whole spectrum at any given time. In order to enable the UE to save battery power it would be wise that the UE listens to only some of the component carriers to start with and then the eNB scheduler, based on the activity of the UE can direct it to monitor subset of component carriers.

4.1. Idle Mode Camping

If all component carriers are configured as R8 compatible, the full system information and paging should be broadcast on each component carrier. However we see this as wastage of the resources. We think since all these component carrier belongs to one cell there may not be any benefit for putting the paging and broadcast information in each of the component carrier. We suggest that there should be only a subset of the component carrier in the cell that carries broadcast and paging information and we call this carrier component as the Anchor or Primary Carrier Component as shown in FIG. 3. This would also mean that the Idle mode UE will camp on this Anchor Component and shall read the system and paging information from it.

4.2. UE in Connected Mode.

Release 8 LIE will only be scheduled on the Anchor Carriers as they have the same structure as the LTE Release 8.

For Release 9, since the LE will be camped on the Anchor Carrier Component of the cell we would suggest that it would be logical that the UE would initiate RRC Connection Establishment Procedure on the Anchor Carrier Component. Once the RRC Connection or an EPS bearer is established the, UE shall be instructed by the network to move on to the different component carrier at a suitable instance. This will help in balancing the load among different carriers within the cell and reduction in UE battery consumption as the LIE would only monitor a subset of the carrier components together with the anchor carrier component.

Proposal 2: There should be a Mechanism Available Through which the UE should be Moved Around the Different Component Carriers.

Signalling of which component carriers the UE will monitor and transmit/receive the data on can be done by PDCCH Signalling MAC Signalling RRC Signalling.

In all the three cases we would need an IE that would be 5 bit long with each bit corresponding to a component carrier which the UE should monitor.

PDCCH Signalling: Signalling the UE which component carrier it should monitor through PDCCH is the fastest although it is unreliable. We could have a special PDCCH format with 5 bits bitmap indication to the UE in sub frame (n−1) that it should start listening to the component carriers for which the bit is set to 1 from sub frame n onwards until further change is signaled.

MAC Signalling: Signalling the UE which component carrier it should monitor through MAC Control element is fast and fairly reliable. We could have an IE in the DRX Command MAC Control Element with 5 bits bitmap indication to the UE that it should start listening to the component carriers for which the bit is set to 1. eNB will assume that the UE has applied the new configuration after it has received the acknowledgement from the UE.

RRC Signalling: RRC layer Signalling the UE which component carrier it should monitor through in a RRC message would be slow and although very reliable. As the component carriers a LIE may monitor may change frequently RRC signaling may not be a suited for this purpose.

Hence our preference would be to use MAC Signalling for indicating the UE which component carriers it should monitor.

Proposal 3: MAC Signalling be Used to Indicate to the UE which Carrier Component it should Monitor Further there is no point in the UE monitoring all the carriers as the UE would not be transmitting or receiving on these carriers. Moreover, since the retransmissions will be performed on the respective HARQ entities for each carrier, hence it makes sense that UE switches off the RF Circuitry of the Component carriers it is not monitoring.

Proposal 4: UE could be Configured to Monitor the Anchor Carrier and a Subset of the Carriers.

4.3. DRX Handling

In Rel 8 we have a DRX defined such that the UE remains awake for the on-duration and monitors PDCCH and then goes to sleep. This concept is shown in FIG. 4.

We can two possible ways of configuring DRX for LTE Advance.

Alternative 1: We can still keep the basic Rel-8 mechanism for LTE advance with certain modification and keep the system simple and backward compatible. We can have a 2 level DRX configuration in LTE. On the first level we will have only one DRX configuration (On Duration, DRX Cycle) configured by RRC for the UE, identical to what we had it in Release 8. On the second level, during the "On-Duration" UE will monitor the carriers indicated by the MAC control element (DRX Command MAC Control Element). Hence even during the on-duration the UE will monitor only those carriers that are actually needed to be monitored and can switch off the RF Circuit for reveiving the other carriers. This will provide considerable saving in battery life.

When the UE activity increases, the UE will start transmitting/receiving on the increased number of component carriers but the On duration would remain unchanged. If UE is already transmitting/receiving on on all the component carriers and if there is a further increase in the activity, the on-duration will be increased.

Alternative 2: Another general alternative is to have the one DRX configuration per component carrier (On Duration, DRX Cycle) and the UE "ORs" the DRX configuration per component carrier to determine other the overall DRX pattern. However, battery savings in the UE will be less in case DRX Cycles and the starting instance of the On Duration of the component carriers are not aligned. Hence a better way would be to have the same DRX cycle on all component carrier with a different on duration.

Also the DRX cycle in one component carrier could be a integral multiple of DRX cycle on the other component carrier.

CONCLUSIONS

In this paper we discuss how the IE in the idle and connected mode be assigned to monitor a subset of carriers. The main proposal of the contribution are Proposal 1: Idle mode UE will camp on Anchor Component and shall read the system and paging information from it Proposal 2: There should be a mechanism available through which the UE should be moved around the different component carriers.

Proposal 3: MAC Signalling be used to indicate to the UE which carrier component it should monitor Proposal 4: UE could be configured to monitor the Anchor Carrier and a subset of the carriers.

We request RAN 2 to discuss this and NEC would be happy to draft a text proposal for the TR to capture the agreements in the TR.

This application is based upon and claims the benefit of priority from United Kingdom Patent Application No. 0907180.4, filed on Apr. 27, 2009, the disclosure of which is incorporated herein in its entirety by reference.

The invention claimed is:

1. A method for a user equipment (UE), the method comprising:

performing communication over a plurality of component carriers including a primary component carrier and at least one secondary component carrier;

receiving a Medium Access Control (MAC) control element including a bitmap, each bit of at least part of the bitmap corresponding to one of the at least one secondary component carrier, wherein the bitmap indicates that the UE is to monitor data on at least one secondary component carrier corresponding to at least one bit among the bitmap set to "1"; and monitoring the data on the primary component carrier and the at least one secondary component carrier corresponding to the at least one bit among the bitmap set to "1", and wherein the MAC control element causes the UE to deactive at least one secondary component carrier which corresponds to at least one respective bit among the bitmap not set to "1".

2. The method according to claim 1, further comprising: performing a retransmission on a respective Hybrid Automatic Retransmission Request (HARQ) entity corresponding to a respective cell of each of the primary component carrier and the at least one secondary component carrier corresponding to the at least one bit among the bitmap set to "1".

3. A user equipment (UE) comprising:

at least one memory storing instructions; and at least one processor configured to process the instructions to:

perform communication over a plurality of component carriers including a primary component carrier and at least one secondary component carrier;

receive a Media Access Control (MAC) control element including a bitmap, each bit of at least part of the bitmap corresponding to one of the at least one secondary component carrier, wherein the bitmap indicates that the UE is to monitor data on at least one secondary component carrier corresponding to at least one bit among the bitmap set to "1"; and monitor the data on the primary component carrier and the at least one secondary component carrier corresponding to the at least one bit among the bitmap set to "1", and wherein the MAC control element causes the UE to deactive at least one secondary component carrier which corresponds to at least one respective bit among the bitmap not set to "1".

4. A method for a base station, the method comprising:

performing communication over a plurality of component carriers including a primary component carrier and at least one secondary component carrier; and sending a Media Access Control (MAC) control element to a user equipment (UE) including a bitmap, each bit of at least part of the bitmap corresponding to one of the at least one secondary component carrier, wherein the MAC control element is configured with each bit of the bitmap, corresponding to the one of the at least one secondary component carrier that the UE is to monitor data, respectively set to "1", wherein the data is monitored by the UE on the primary component carrier and the one of the at least one secondary component carrier corresponding to the at least one bit among the bitmap set to "1", and wherein the MAC control element causes the UE to deactive at least one secondary component carrier which corresponds to at least one respective bit among the bitmap not set to "1".

5. A base station comprising:
at least one memory storing instructions; and
at least one processor configured to process the instructions to:
   perform communication over a plurality of component carriers including a primary component carrier and at least one secondary component carrier; and
   send a Media Access Control (MAC) control element to a user equipment (UE) including a bitmap, each bit of at least part of the bitmap corresponding to one of the at least one secondary component carrier, wherein the MAC control element is configured with each bit of the bitmap, corresponding to the one of the at least one secondary component carrier that the UE is to monitor, respectively set to "1", and wherein the data is monitored by the UE on the primary component carrier and the one of the at least one secondary component carrier corresponding to the at least one bit among the bitmap set to "1", and wherein the MAC control element causes the UE to deactive at least one secondary component carrier which corresponds to at least one respective bit among the bitmap not set to "1".

* * * * *